2,890,717

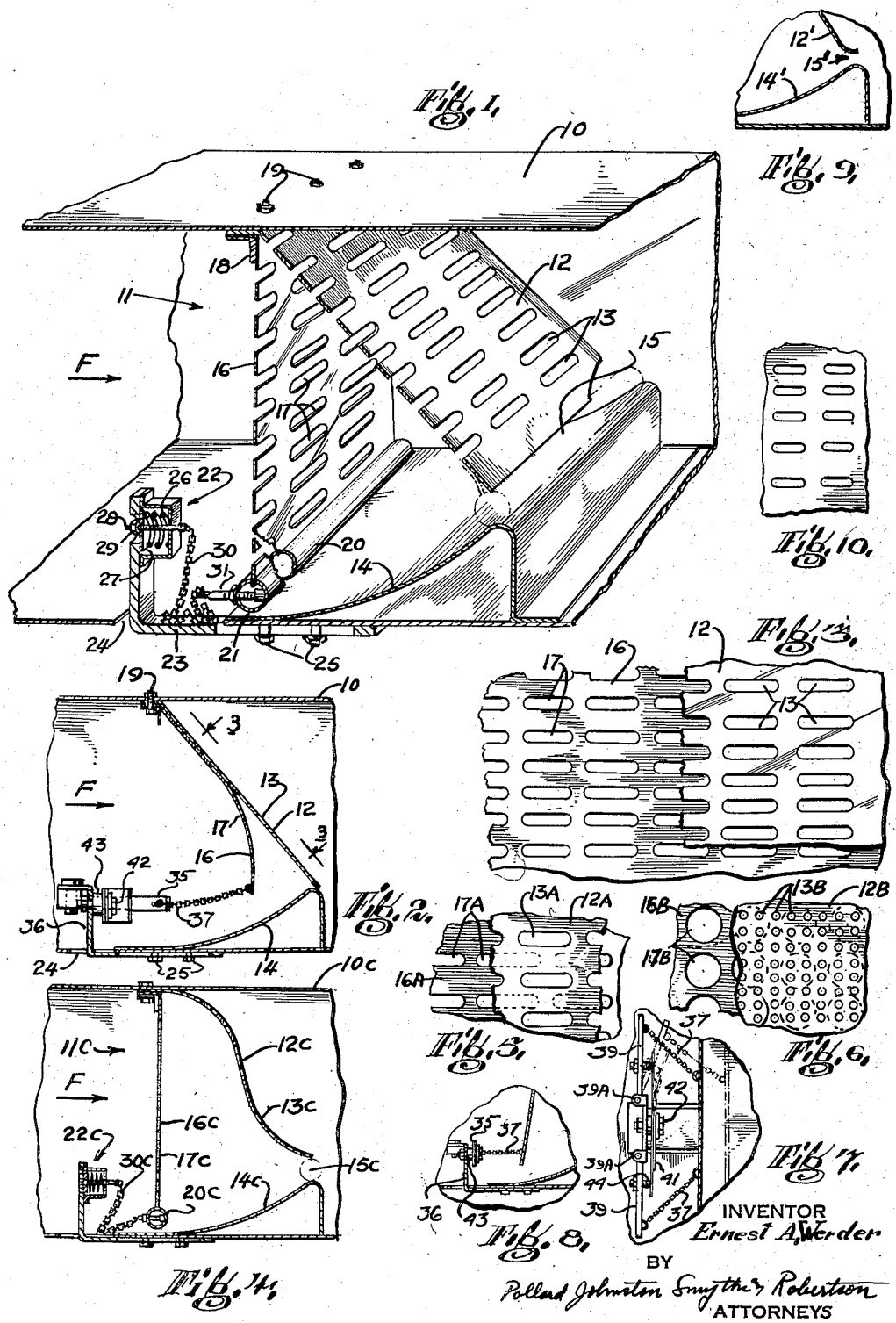
June 16, 1959    E. A. WERDER    2,890,717
FLOW CONTROL DEVICE
Filed Nov. 8, 1955
INVENTOR
Ernest A. Werder
BY
Pollard Johnston Smythe & Robertson
ATTORNEYS United States Patent Office 2,890,717
Patented June 16, 1959

FLOW CONTROL DEVICE

Ernest A. Werder, Rego Park, N.Y., assignor to Buensod-Stacey, Incorporated, New York, N.Y., a corporation of Delaware Application November 8, 1955, Serial No. 545,598

14 Claims. (Cl. 137—521)

This invention relates generally to flow control devices, and is particularly directed to devices for controlling, or maintaining constant, the rate of fluid flow through ducts, for example, the air delivery ducts extending from a central air conditioning apparatus to a plurality of individual distributing units.

It is well-known that variations of fluid pressure in a fluid distribution line or duct result in an inconstant or varying rate of flow. In air conditioning systems, particularly those employing a central air conditioning apparatus from which air is delivered to a plurality of individual distributing units, pressure variations in the air delivery lines or ducts occur frequently by reason of the irregular and changing demand for air in the rooms being conditioned. The consequent changes in the rate of air flow through the delivery ducts contribute to the creation of objectionable audible noises that commonly accompany the operation of existing air conditioning systems.

Although various types and constructions of flow control devices have been proposed, wherein the effective size of an orifice in a duct or line is controlled in response to the fluid pressure in the latter, it is an object of the present invention to provide an improved flow control device of simple and inexpensive construction that is particularly adapted for reliably maintaining a substantially constant, or other controlled rate of air flow in the delivery ducts of air conditioning systems, wherein large volumes of air under frequently varying pressures are handled.

Another object is to provide a flow control device of the described character, wherein the substantially constant, or other controlled volumetric rate of fluid flow to be maintained by the device, can be adjusted within an appreciable range.

Still another object is to provide a device for controlling the flow of a fluid through a duct or the like in response to the fluid pressure, and wherein the characteristics of such response may be prearranged by the formation given to an element of the device at the time of its fabrication.

One form that the invention may take is characterized by the provision of a flexible curtain extending across the duct or the like carrying the fluid flow to be controlled and depending from the top of the duct, and a fixed, preferably perforated sheet of rigid material extending across the duct at the downstream side of the flexible curtain and generally diverging downwardly from the curtain when in open position. The flexible curtain may be weighted, or may be restrained by a yieldable means at its lower edge so that the curtain is moved against the fixed sheet progressively from the top to bottom thereof in response to increases in the pressure head of the flow. If both the fixed sheet and flexible curtain are perforated, the perforations can be arranged relative to each other so that, as portions of the curtain come into contact with the fixed sheet, the related perforations of the curtain and sheet are covered by, or register with, solid areas of the sheet and curtain, respectively. As a result, the effective area of the opening or orifice through which the fluid can flow is progressively decreased in response to increases in the pressure head of the fluid flow to maintain constant, or otherwise control, the fluid flow. As flow increases, the curtain will move into contact with the rigid sheet closing off some of the apertures or modifying flow therethrough. As flow decreases thereafter, the curtain will peel off from the sheet to increase air flowing therethrough. Thus, the device operates in response to demand for increased flow to maintain the flow constant. Also, the perforations can be staggered relative to each other or they can be arranged relative to each other in various patterns to modify the results desired.

The above, and other objects, features and advantages of the invention, will become apparent from the following description and drawings, which are merely exemplary.

In the drawings:

Fig. 1 is a fragmentary perspective view partially in section;

Fig. 2 is a reduced size sectional view of another form of the invention, the flexible sheet having been moved in response to an increased pressure head of the flow within the duct;

Fig. 3 is a fragmentary view, taken in the direction of the arrows 3—3 of Fig. 2, and showing the relationship between a rigid fixed sheet and a flexible curtain having staggered perforations when the curtain is moved into contact with the fixed sheet;

Fig. 4 is a reduced size sectional view generally similar to Fig. 1, but showing a modified form of the rigid sheet;

Fig. 5 is a fragmentary view of a modified arrangement of the apertures, the view being taken at a position with the curtain against the sheet;

Fig. 6 is similar to Fig. 5 but illustrates a further arrangement of apertures;

Fig. 7 is a fragmentary view of a modified form of spring, such as shown in Fig. 2;

Fig. 8 is a side view of Fig. 7;

Fig. 9 is a fragmentary portion of Fig. 1 showing a modified form thereof;

Fig. 10 is a fragmentary plan view of a rigid sheet showing a still further form of aperture arrangement.

Referring to the drawing in detail, and initially to Fig. 1 thereof, a flow control device embodying this invention is there shown installed in a duct 10 and is generally identified by the numeral 11. Although either a liquid or gas may flow through the duct 10 and be controlled by the device 11, the latter is particularly adapted for use in the delivery ducts of known air conditioning systems which deliver the air from a central conditioning apparatus to a plurality of distributing units. In Figs. 1 and 2, as well as in Fig. 4, which will be referred to in detail hereinafter, the direction of the fluid flow through the duct 10 is indicated by the arrow F.

The flow control device 11 includes a stationary, rigid sheet 12 extending across or crosswise of the duct 10 and approximately from top to bottom, usually angled from the vertical. The stationary sheet 12, which may be formed of metal or any other suitably rigid material, generally diverges downwardly in the direction of the fluid flow F from a transverse plane perpendicular to the longitudinal axis of the duct 10 and has a series of perforations 13 formed therein, the lower edge being spaced from baffle 14 and being sized so that weight 20 will be received therein.

A fixed baffle 14 is mounted upon the bottom of the duct 10 and extends across the latter. The baffle 14 curves upwardly from a location generally in vertical alignment with the upper edge of stationary sheet 12 to sheet 13.

The flow control device 11 further includes a flexible sheet or curtain 16, which may be formed of a plastic sheet material extending across the duct 10 at the upstream side of the rigid sheet 12. The curtain 16 may be formed with a series of perforations 17 therein, and depends from the top of the duct 10 at a location adjacent the upper edge of the rigid sheet 12. Alternately, the curtain 16 could be made imperforate.

As seen in Fig. 1, the rigid sheet 12 and flexible curtain 16 may be secured to the top of the duct 10 by an angle member 18 extending across the lower surface of the duct top and secured to the latter by bolts 19, with the upper edge portions of the sheet 12 and curtain 16 clamped between a leg of the angle member 18 and the top of the duct. The lower edge of flexible curtain 16 may be weighted, for example, by a split tube 20 which extends along and embraces the lower edge of the flexible curtain. As seen in Figs. 2 and 8, the weight may be omitted.

When there is no fluid flow, or only a small rate of flow, through duct 10, flexible curtain 16 hangs substantially vertically in the duct with an open passage 21 between tube 20 and the baffle 14, and the rigid sheet 12 diverges downwardly from the flexible curtain at the downstream side of the latter (Fig. 1), so that the flexible curtain is spaced from the rigid sheet throughout their respective heights. Any fluid flowing in the duct 10 is then free to pass through all the perforations 17 of curtain 16 and the passage 21 between the tube 20 and the baffle 14, and then through all the perforations 13 of the sheet 12 and opening 15, with the fluid flow being throttled to only a slight degree. However, as the fluid flow tends to increase, the pressure head acting on the flexible curtain 16 correspondingly rises and the curtain is deflected in the downstream direction, that is, toward the rigid sheet 12. The flexible curtain seals the perforations of the fixed sheet in a predetermined progressive manner, restrained by the weight 20 or springs, so as to control the rate of flow of fluid in duct 10. The pressure head acting against and deflecting the curtain 16 gives to the latter an arcuate configuration following the form as seen in Fig. 2, such being convex at the downstream side. Thus, as the fluid flow tends to increase, with a rising pressure differential across 11 the curtain 16 moves into contact with the fixed sheet 12, beginning at the upper edge of the latter and progressing toward the lower edge of the fixed sheet 12. If desired, the spacing at 15 can be dimensioned closely relative to weight 20 so that the opening is substantially closed. When in open position, the sheet 16 does not necessarily hang vertical but may be pulled away from the vertical by the spring means.

In one form of the invention, perforations 13 in the rigid sheet 12 and perforations 17 in the flexible curtain 16 are arranged so that when curtain 16 lies against the sheet 12, perforations 17 will register with solid portions of the sheet 12 and perforations 13 will register with solid portions of the curtain 16. Thus, as the curtain 16 is deflected into contact with a progressively increasing area of the rigid sheet 12 in response to an increasing volumetric rate of fluid flow through the duct 10, and perforations 13 and 17 of the contacting portions of sheet 12 and curtain 16 are thereby closed, the effective cross-sectional area within the duct through which the fluid can flow is correspondingly decreased and the fluid flow is throttled to maintain the rate of flow at a substantially constant value, or to otherwise control the rate of flow.

In another form and in order to provide better support, perforations 17A of curtain 16A (Fig. 5) may be staggered relative to perforations 13A of rigid sheet 12A.

In a still further form, fixed plate 12B (Fig. 6) may have a plurality of relatively small apertures 13B and curtain 16B may have a smaller number of larger apertures 17B. In this arrangement, there will always be some registering apertures to provide minimum flow.

In a still further arrangement, aperture rows may be spaced in varying manners or the apertures varied in size so as to modify control chaacteistics of the device as seen in Fig. 10.

In order to limit the movement of the flexible curtain 16, at least as the lower portion of the latter nears the rigid sheet 12 in response to a high pressure head in the fluid flow, the flow control device 11 includes an assembly, generally identified by the numeral 22, for applying a resilient or yieldable drag to the lower edge of the curtain after the latter has moved a predetermined distance from its free hanging or its open position (Fig. 1) toward the rigid sheet 12. In the form seen in Fig. 1, assembly 22 may include an L-shaped mounting bracket 23 having its horizontal leg disposed against the underside of the bottom of duct 10, while the vertical leg of the bracket 23 extends upwardly through a longitudinally elongated slot 24 in the duct bottom. The bracket 23 is suitably mounted on the duct 10 for adjustment along the latter, for example, by bolts 25 which extend through the horizontal leg of the bracket and through the slot 24 of the duct. Mounted on the vertical leg of the bracket 23 is a spring 26, for example, a helical compression spring, which is abutted by disc 27 having an eye-bolt 28 extending centrally therethrough. A nut 29 is threaded on the end of bolt 28 to bear against the disc 27, and a suitable chain or other flexible means 30 extends from the eye of bolt 28 to the tube 20, the chain 30 being preferably connected to eye-bolts 31 secured to the tube at suitable locations such as to the opposite end portions of said tube 20.

In the form illustrated in Fig. 1, chain means 30 can be of sufficient length so that there will be slack present therein until the tube 20 nears the lower edge of sheet 12 in response to high pressure head in the fluid flow. After all the slack in chain 30 has been taken-up, further movement of the lower edge of curtain 16 toward the sheet 12 can occur only by overcoming the resistance imposed by spring 26. It is apparent that the position of curtain 16 at which spring 26 becomes effective to resist further movement of the curtain toward rigid sheet 12 can be varied by loosening bolts 25 and shifting bracket 23 longitudinally relative to duct 10. Thus, by moving bracket 23 in the downstream direction, the coming into effect of spring 26 can be delayed, or even completely avoided, while the movement of the bracket in the upstream direction brings spring 26 into action when the lower edge of the curtain is further from the fixed, rigid sheet, that is, at a lower pressure head within the fluid flow. It is to be noted that spring 26 also serves to pull the lower edge portion of the curtain 16 away from rigid sheet 12 when the pressure head in the fluid flow is reduced following the occurrence of an excessive pressure, and thereby further prevents sticking of the curtain against the rigid sheet.

Although the above described adjustment of the bracket 23 makes it possible to vary the response of the curtain 16 to at least high pressure heads in the fluid flow through the duct 10, and hence the characteristics of the control of the rate of fluid flow, it is apparent that the control characteristics are influenced not only by the degree of deflection of the flexible curtain 16 obtained in response to variations of the pressure head, but also by the shape of the baffle 14, which establishes the size of the passage 21 between the tube 20 and baffle 14 as the curtain is deflected from its free hanging position (Fig. 1) to a final position in contact with the entire area of the rigid sheet 12, and by the shape of the rigid sheet 12 which determines to what extent any given deflection of the curtain 16 brings the latter into contact with the rigid sheet 12 to close the related perforations 17 and 13, respectively.

Referring to Fig. 4 of the drawing, it will be seen that the modified flow control device, identified by the numeral 11C, is generally similar to the device 11 described above with reference to Fig. 1, and the several parts of the flow control device 11C are accordingly identified by the same reference numerals employed in connection with the corresponding parts of the device 11, but with the letter C appended thereto. The flow control device 11C differs from the device 11 with respect to the configurations of the fixed, rigid sheet 12C and the baffle 14C. Thus, while the rigid sheet 12 of the flow control device 11 is substantially flat (Figs. 1 and 2) and diverges uniformly from the curtain 16 when the latter is in its free hanging or undeflected position, the rigid sheet 12C of the embodiment of Fig. 4 has a curved portion arranged so that its divergence from the free hanging plane of the curtain 16C is non-uniform and provides correspondingly altered control characteristics. Generally speaking, rigid sheet 12C would, as compared with sheet 12, tend to delay the closing of the perforations 13C and 17C at relatively low pressure heads and at relatively high pressure heads, while the control characteristic at intermediate pressure heads would be more or less similar to the corresponding portion of the control characteristics with the flat, rigid sheet 12.

It is obvious that the strength and location of the spring 26, the weight of the tube 20, the shape and inclination of the rigid sheet 12, the size and number of the perforations 13 and 17, and the shape and location of the baffle 14 are all factors influencing the control characteristics of the flow control device, and these various factors may all be selected either to ensure a substantially constant volumetric rate of fluid flow through duct 10, as the pressure head varies, or to obtain a rate of flow which varies with changes in the pressure head according to some predetermined relationship, the arrangements illustrated in Figs. 1, 2 and 4, respectively, merely representing different forms that may be adopted.

The leaf spring arrangement of Figs. 2, 7, and 8 preferably is used in place of the spring and chain seen in Figs. 1 and 4. Leaf spring 35 can be fastened to post 36, post 36 being similar to bracket 23 of Fig. 1. Flexible chains or links 37 can be fastened to the curtain schematically illustrated at 38 (Figs. 7 and 8), the other ends thereof being attached to bars 39, bars 39 being adjustably pivotably mounted at 39A to post 36. In this form, the chain or link normally is held in extended position, the leaf spring taking up the slack therein. A second shorter leaf spring 41 can be placed on top of spring 35 and held in place by bolt means 42. The leaf spring assembly can be spaced from post 36 by spacer means 43. Pivoted bars 39 have contacting adjustably contacting bottoms or abutments 44 for contacting the spring, the position of said abutments relative to their pivots governing the resistance of the spring assembly to movement of the flexible sheet. The abutments can be moved longitudinally relative to its bar. Preferably, the chains are attached to the flexible sheet so that they converge toward its center.

Where desired, a space 15', as seen in Fig. 9, could be left for by-pass purposes.

Further, although particular structural embodiments of the invention have been described in detail herein and shown in the accompanying drawing, it is to be understood that the various details of construction may be changed without departing from the scope or spirit of the invention as defined in the appended claims.

What is claimed is:

1. A device for controlling fluid flow through a duct comprising a fixed, rigid sheet extending across the duct, a flexible curtain extending across the duct at the upstream side of said rigid sheet and being suspended, at its upper edge, from the top of the duct adjacent the upper edge of said rigid member, said rigid sheet being formed so that it generally diverges downwardly away from said flexible curtain when the device is in open position, said rigid sheet and flexible curtain having perforations therein, and means inhibiting movement of the lower edge of said flexible curtain so that, in response to an increasing fluid pressure head in the duct acting on said flexible curtain, said curtain is deflected into contact with said rigid sheet over a progressively increasing area of the latter starting at the top of the rigid sheet against the action of said inhibiting means, said perforations being arranged in said rigid sheet and flexible curtain so that the area for passing fluid therethrough in the contact portions of the sheet and curtain will be reduced to maintain approximately uniform fluid flow through said duct.

2. A device for controlling fluid flow through a duct comprising a fixed, rigid sheet extending across the duct, a flexible curtain extending across the duct at the upstream side of said rigid sheet and being suspended at its upper edge within the duct adjacent the upper edge of said rigid member, said rigid sheet and said flexible curtain being formed so that said sheet and curtain are, at least adjacent their lower edges, spaced from each other when the device is in open position, said rigid sheet and flexible curtain having perforations therein which are at least partially out of alignment, and hence at least partially closed when the related parts of the rigid sheet and flexible curtain are brought together, so that deflection of said curtain against the rigid sheet by the fluid pressure head within the duct acting on said curtain causes progressive maintenance of substantially uniform fluid flow through said duct, and means yieldably resisting at least the final increment of the deflection of said curtain against said rigid sheet.

3. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, said curtain and rigid sheet having perforations therein arranged to be out of alignment when said flexible curtain is in surface contact with said rigid sheet, and means connected to the lower edge of said flexible curtain so that said lower edge of said flexible curtain is spaced from the lower edge of said rigid sheet so as to permit a fluid flow through said perforations and, as the fluid pressure head within the duct increases, it acts on said curtain and deflects it into contact with said rigid sheet over a progressively increasing area of the latter starting at said upper edge thereof, whereby said perforations of the contacting portions of the curtain and sheet are closed and throttle the fluid flow in accordance with the fluid pressure head.

4. A device for controlling fluid flow through a duct comprising a fixed, rigid sheet extending across the duct and diverging in the downstream direction from a vertical plane extending through its upper edge, a flexible curtain extending across the duct and suspended, at its upper edge adjacent said upper edge of the rigid sheet, said curtain and rigid sheet having perforations therein arranged to have the area of fluid flow therethrough reduced when said flexible curtain is in surface contact with said rigid sheet, means connected to the lower edge of said flexible curtain so that said lower edge of said flexible curtain is spaced from the lower edge of said rigid sheet so as to permit a fluid flow through said perforations and, as the fluid pressure head within the duct increases, it acts on said curtain and deflects it into contact with said rigid sheet over a progressively increasing area of the latter starting at said upper edge thereof, whereby said perforations of the contacting portions of the curtain and sheet throttle the fluid flow in accordance with the fluid pressure head, said connecting means being operative as the lower edge portion of said flexible curtain nears said rigid sheet to increasingly yieldably resist further movement of said lower edge portion of the curtain toward said rigid sheet.

5. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, said curtain and rigid sheet having perforations therein arranged to have the area of fluid flow therethrough reduced when said flexible curtain is in surface contact with said rigid sheet, means connected to the lower edge of said flexible curtain so that the latter is angularly related to said rigid sheet for permitting a fluid flow through said perforations and, as the fluid pressure head within the duct increases, said curtain is deflected into contact with said rigid sheet over a progressively increasing area of the latter starting at said upper edge thereof, whereby said perforations of the contacting portions of the curtain and sheet maintain approximately uniform fluid flow through said duct, spring means for resisting the movement of said curtain toward the rigid sheet, and lost motion transmitting means connected between said spring means and the lower edge of said flexible curtain so that said spring means becomes operative only as said lower edge of the curtain nears said rigid sheet.

6. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, said curtain and rigid sheet having perforations therein arranged to have the area of fluid flow therethrough reduced when said flexible curtain is in surface contact with said rigid sheet, means weighting the lower edge of said flexible curtain so that the latter is spaced from said rigid sheet when in open position for permitting a fluid flow through said perforations and, as the fluid pressure head within the duct increases, said curtain is deflected into contact with said rigid sheet over a progressively increasing area of the latter starting at said upper edge thereof, whereby said perforations of the contacting portions of the curtain and sheet maintain approximately uniform fluid flow through said duct, spring means for resisting the movement of said curtain toward the rigid sheet, and flexible connecting means between said spring means and the lower edge of said flexible curtain and having substantial slack therein when said curtain is in its open position so that said spring means becomes operative only as said lower edge of the curtain nears said rigid sheet.

7. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, said curtain and rigid sheet having perforations therein arranged to reduce fluid flow therethrough when said flexible curtain is in surface contact with said rigid sheet, means weighting the lower edge of said flexible curtain so that the latter is spaced from said rigid sheet when in open position for permitting a fluid flow through said perforations and, said curtain is deflected into contact with said rigid sheet over a progressively increasing area of the latter starting at said upper edge thereof as flow increases, whereby said perforations of the contacting portions of the curtain and sheet maintain approximately uniform fluid flow through said duct, spring means for resisting the movement of said curtain toward the rigid sheet, means mounting said spring means for adjustment in the longitudinal direction of the duct, and flexible connecting means between said spring means and the lower edge of said curtain and having substantial slack therein when said curtain hangs freely in a vertical position within the duct so that said spring means becomes operative only as said lower edge of the curtain reaches a predetermined position near the rigid sheet depending upon the adjusted position of said spring means along the duct.

8. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, the lower edge of said rigid sheet being spaced upwardly from the bottom of the duct, said curtain and rigid sheet being substantially coextensive when developed on a flat plane and having perforations arranged therein so as to be out of alignment when the related portions of said curtain and sheet are in surface contact with each other, means connected to the lower edge of said flexible curtain so that the latter is spaced from said rigid sheet when in open position out of surface contact with the rigid sheet whereby fluid flow is then free to occur through said perforations and, as the fluid pressure head within the duct increases, said curtain is deflected into contact with said rigid sheet over a progressively increasing area of the latter starting at said upper edge thereof to close the related perforations for maintaining approximately uniform fluid flow through said duct, and a baffle extending upwardly from the bottom of the duct and spaced vertically from the lower edge of said rigid sheet.

9. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, the lower edge of said rigid sheet being spaced upwardly from the bottom of the duct, said curtain and rigid sheet being substantially coextensive when developed on a flat plane and having perforations arranged therein so as to be out of alignment when the related portions of said curtain and sheet are in surface contact with each other, means connected to the lower edge of said flexible curtain so that the latter is spaced from said rigid sheet when in open position out of surface contact with the rigid sheet whereby fluid flow is then free to occur through said perforations and, as the fluid pressure head within the duct increases, said curtain is deflected into contact with said rigid sheet over a progressively increasing area of the latter starting at said upper edge thereof to close the related perforations for maintaining approximately uniform fluid flow through said duct, a baffle extending upwardly from the bottom of the duct and spaced vertically from the lower edge of said rigid sheet, and means operative as the lower edge portion of said flexible curtain nears said rigid sheet to yieldably resist further movement of said lower edge portion of the curtain toward said rigid sheet.

10. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, the lower edge of said rigid sheet being spaced upwardly from the bottom of the duct, said curtain and rigid sheet being substantially coextensive when developed on a flat plane and having perforations arranged therein to reduce fluid flow therethrough when the related portions of said curtain and sheet are in surface contact with each other, means connected to the lower edge of said flexible curtain so that the latter is maintained out of surface contact with the rigid sheet whereby fluid flow is then free to occur through said perforations and, as the fluid pressure head within the duct increases, said curtain is deflected into contact with said rigid sheet over a progressively increasing area of the latter starting at said upper edge thereof for throttling the fluid flow in accordance with the fluid pressure head, a baffle extending upwardly from the bottom of the duct and spaced vertically from the lower edge of said rigid sheet, spring means for resisting the movement of said curtain toward the rigid sheet, and lost motion transmitting means connected between said spring means and the lower edge of said flexible curtain so that said spring means becomes operative only as said lower edge of the curtain nears said rigid sheet.

11. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, the lower edge of said rigid sheet being spaced upwardly from the bottom of the duct, said curtain and rigid sheet being substantially coextensive when developed on a flat plane and having perforations arranged therein so as to be out of alignment when the related portions of said curtain and sheet are in surface contact with each other, means weighting the lower edge of said flexible curtain so that the latter tends to hang vertically within the duct out of surface contact with the rigid sheet whereby fluid flow is then free to occur through said perforations and, as the fluid pressure head within the duct increases, said curtain is deflected into contact with said rigid sheet over a progressively increasing area of the latter starting at said upper edge thereof to close the related perforations for throttling the fluid flow in accordance with the fluid pressure head, a baffle extending upwardly from the bottom of the duct and spaced vertically from the lower edge of said rigid sheet so that, when said curtain contacts said rigid sheet over the entire area of the latter to close all of said perforations, some fluid flow is permitted between said baffle and rigid sheet, spring means for resisting the movement of said curtain toward the rigid sheet, and flexible connecting means between said spring means and the lower edge of said flexible curtain and having substantial slack therein when said curtain is in its free hanging, vertical position so that said spring means becomes operative only as said lower edge of the curtain nears said rigid sheet.

12. A device for controlling fluid flow through a duct comprising a fixed, rigid sheet extending across the duct and diverging in the downstream direction from a vertical plane extending through its upper edge, a flexible curtain extending across the duct and suspended, at its upper edge, adjacent said upper edge of the rigid sheet, the lower edge of said rigid sheet being spaced upwardly from the bottom of the duct, said curtain and rigid sheet being substantially coextensive when developed on a flat plane and having perforations arranged therein so as to reduce the area of fluid flow therethrough when the related portions of said curtain and sheet are in surface contact with each other, means weighting the lower edge of said flexible curtain so that the latter tends to hang vertically within the duct out of surface contact with the rigid sheet whereby fluid flow is then free to occur through said perforations and, as the fluid pressure head within the duct increases, said curtain is deflected into contact with said rigid sheet over a progressively increasing area of the latter starting at said upper edge thereof to throttle the fluid flow in accordance with the fluid pressure head, a baffle extending upwardly from the bottom of the duct and spaced vertically from the lower edge of said rigid sheet so that, when said curtain contacts said rigid sheet over the entire area of the latter to close all of said perforations, some fluid flow is permitted between said baffle and rigid sheet, spring means for resisting the movement of said curtain toward the rigid sheet, means mounting said spring means for adjustment in the longitudinal direction of the duct, and flexible connecting means between said spring means and the lower edge of said curtain and having substantial slack therein when said curtain hangs freely in a vertical position within the duct so that said spring means becomes operative only as said lower edge of the curtain reaches a predetermined position near the rigid sheet depending upon the adjusted position of said spring means along the duct.

13. In a flow control device for fluid carrying duct means or the like, the combination comprising motion limiting means having fluid passage means extending therethrough, and flexible curtain means located in the path of flow of said fluid, said curtain means having a portion secured adjacent an edge of said motion limiting means and a free portion normally spaced from the opposite edge of said motion limiting means so that said motion limiting means and said curtain means are normally inclined relative to each other, said curtain means rolling onto said motion limiting means in direct response to increased relative pressure head on the upstream side and peeling off of said motion limiting means to resume its normal position when the relative upstream pressure head decreases, thereby controlling the flow of fluid through said duct means.

14. In a flow control device for fluid carrying duct means or the like, the combination comprising motion limiting means forming fixed seat means and having fluid passage means extending therethrough, flexible curtain means swingably mounted and located in the path of flow of said fluid, said curtain means having its swingably mounted portion secured adjacent an edge of said motion limiting means and a free portion normally spaced from the opposite edge of said motion limiting means so that said motion limiting means and said curtain means are normally inclined relative to each other, said curtain means rolling onto said motion limiting means in direct response to increased relative pressure head on the upstream side and peeling off said motion limiting means to resume its normal position when the relative upstream pressure head decreases, thereby controlling the flow of fluid through said duct means.

References Cited in the file of this patent

UNITED STATES PATENTS

| 358,568 | Potter | Mar. 1, 1887 |
| 1,364,001 | Shadduck | Dec. 28, 1920 |
| 2,250,614 | Willer | July 29, 1941 |
| 2,787,288 | Shataloff | Apr. 2, 1957 |

FOREIGN PATENTS

| 1,040 | Great Britain | of 1880 |
| 897,639 | Germany | of 1953 |